United States Patent [19]

Lang

[11] 4,125,183
[45] Nov. 14, 1978

[54] ROLLER ASSEMBLY

[76] Inventor: Robert D. Lang, 633 Lido Park, B-1, Newport Beach, Calif. 92663

[21] Appl. No.: 826,467

[22] Filed: Aug. 22, 1977

[51] Int. Cl.² ............................................. B65G 39/02
[52] U.S. Cl. ......................................... 193/37; 16/46
[58] Field of Search ................. 193/35 R, 35 MD, 37; 16/18 R, 18 CG, 19, 20, 21, 22, 23, 43, 45, 46, 47, 48, 38; 29/110; 214/84; 244/137 R; 280/79.1, 32

[56] References Cited

U.S. PATENT DOCUMENTS

| 957,480 | 5/1910 | Svenvig | 16/45 X |
|---|---|---|---|
| 3,435,938 | 4/1969 | Warren et al. | 193/37 |
| 3,445,882 | 5/1969 | Miano | 16/21 |
| 3,739,894 | 6/1973 | Hinman | 193/35 MD |

Primary Examiner—Evon C. Blunk
Assistant Examiner—James L. Rowland
Attorney, Agent, or Firm—Fulwider, Patton, Rieber, Lee & Utecht

[57] ABSTRACT

A roller assembly useful as a self-aligning caster for recessed mounting in a support plate or tray such as those used in aircraft cargo loading systems. The assembly includes a sub-assembly of a cup housing having an upper, outer-annular flange with a roller support mounted therein on an annular bearing. The sub-assembly is secured by a single screw fastener that extends through a central aperture in the bottom wall of the housing and engages a ring retainer. The roller support has massive, upright standards which are spaced apart by the width of the roller and which have opposed slots in their upper faces to receive the support shaft of the roller. The roller and support shaft are received in the support base and are retained therein by a cover plate that has a radial slot to surround the roller and that overlies the roller shaft notches of the upright standards. The cover plate is secured to the roller support by screw fasteners and the like thereby providing a very simple assembly in which a roller is supported with a sufficiently massive structure to permit the application of high loads while, nevertheless, being rotationally self-aligning to permit complete direction of freedom of movement of cargo across the roller assembly.

8 Claims, 6 Drawing Figures

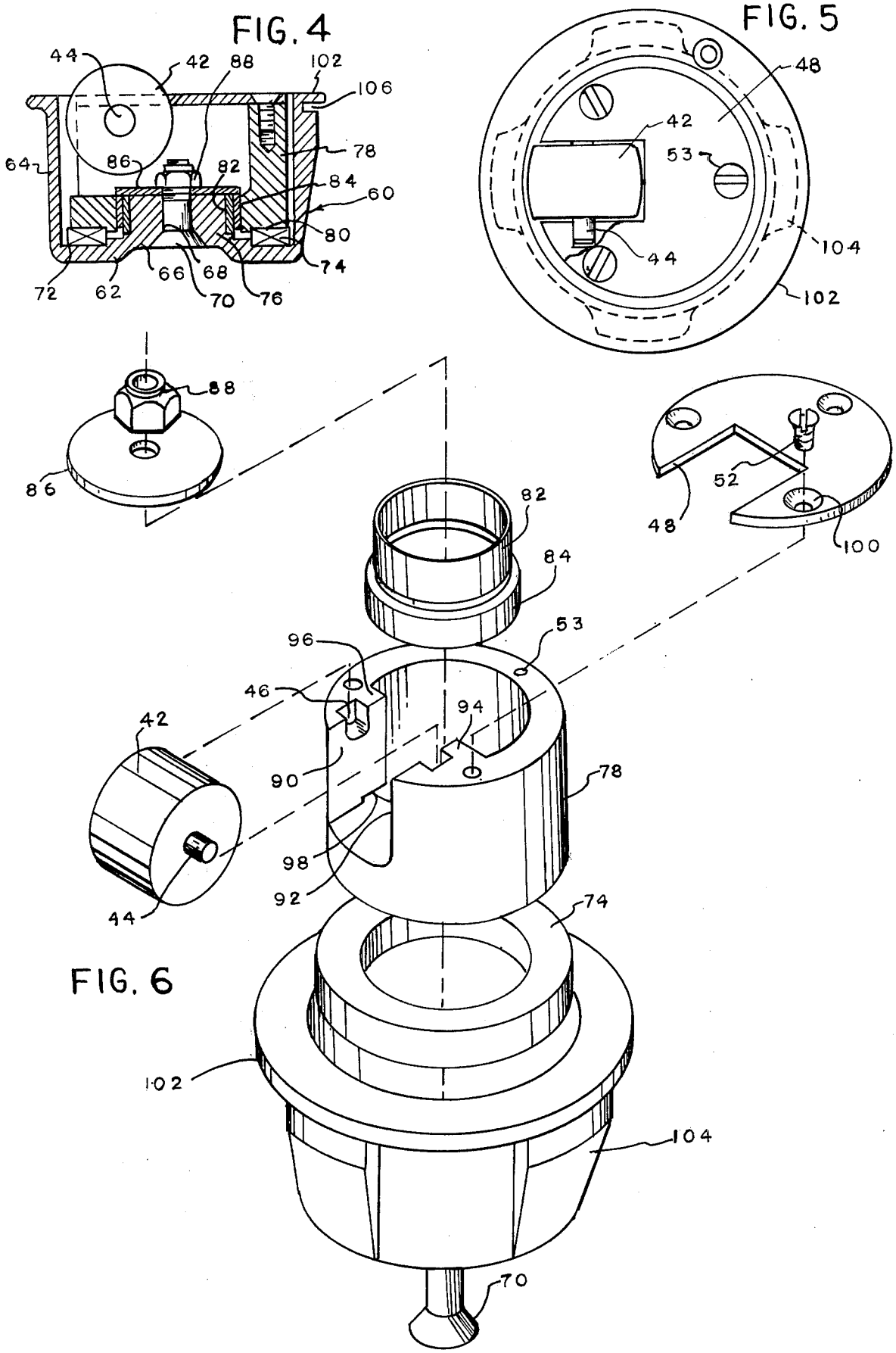

ROLLER ASSEMBLY

BACKGROUND OF THE INVENTION

1. Field of the Invention

This invention relates to self-aligning roller casters and, in particular, to roller assemblies useful in aircraft cargo loading systems.

2. Brief Statement of the Prior Art

Aircraft cargo loading systems commonly employ roller trays in which a plurality of rollers are mounted on a tray support that is secured to the cargo floor of the aircraft. The rollers are at convenient spacings to permit cargo pallets to be freely moved across the floor. In some applications, needle rollers are employed, however, these rollers provide only uni-directional movement of the cargo.

A recent development in cargo loading systems has been a self-aligning roller assembly which is described in U.S. Pat. No. 3,435,938. This assembly employs a pair of rollers that are mounted on upright standards that are laterally offset on a rotationally mounted base plate. This assembly permits free directional movement of cargo, however, it requires the use of two individual rollers which are mounted on upright flanges carried by the rotatable base member. The structure is not readily flush-mounted in the tray but projects therefrom. Additionally, the structure is relatively complex in assembly.

BRIEF DESCRIPTION OF THE INVENTION

The present invention comprises a roller assembly for flush mounting in a support plate. The roller shaft is received in opposed slots of upright, spaced-apart standards of a roller support which is rotatably mounted in a cup-shaped housing of the assembly. The roller and roller shaft are secured in the assembly by a plate which overlies the roller shaft-receiving slots and the roller support is secured to the housing by a single fastener which extends through a central aperture in the floor of the housing to engage a ring retainer that overlies the base of the roller support.

BRIEF DESCRIPTION OF THE FIGURES

The invention will be described with reference to the illustrations of which:

FIGS. 4 and 5 are elevational and plan views of a second embodiment of the invention; and FIG. 6 is an exploded perspective view of the roller assembly of FIGS. 4 and 5.

Referring now to FIG. 1, the roller assembly of the invention is shown as including a cup-shaped housing 10 formed with a flat bottom wall 12 and upright cylindrical wall 14 from which depends a radially outward flange 16. The cup-shaped housing 10 can be a metal stamping and has a central aperture 18 in the bottom wall 12. Aperture 18 is countersunk, as illustrated, to receive the head of flat head machine screw fastener 20.

Figure 1:
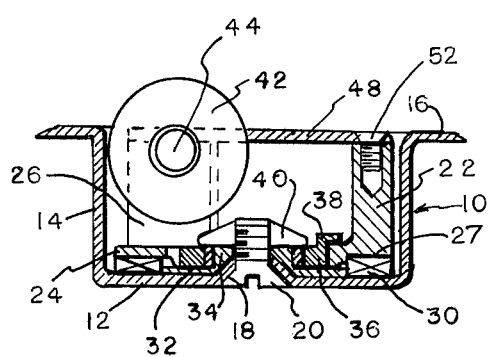
FIGS. 1 and 2 are elevational and plan views, respectively, of one embodiment of the roller assembly.

Received within the interior of the cup-shaped housing 10 is roller support 22 which has a base 24 and a pair of spaced-apart, opposed upright standards 26. The support 22 also has a partial cylindrical wall 28, equally spaced about the periphery of base 24 with the spaced-apart upright standards 26.

The undersurface of the roller support 22 has an annular groove 27 which receives the upper portion of an annular bearing assembly 30. Bearing assembly 30 comprises a conventional assembly of upper and lower bearing braces separated by needle roller bearings and is commercially available.

Mounting ring 32 is placed in the assembly received within the annular bearing assembly 30, thereby serving to orient the bearing assembly in the housing 10. The ring 32 has a central neck 34 which is received within the central aperture of retainer ring 36. The retainer ring 36 seats within a central aperture in the base 24 of the roller support 22 and has an offset, semi-circular lip 38 which overlies a portion of the base 24, thereby serving as an axial stop for the support base 22.

The aforementioned sub-assembly is secured by a single machine screw fastener 20 which extends through and is seated in countersunk aperture 18. The screw fastener engages a conventionally threaded lock nut retainer 40 which overlies the ring retainer 36.

Figure 2:
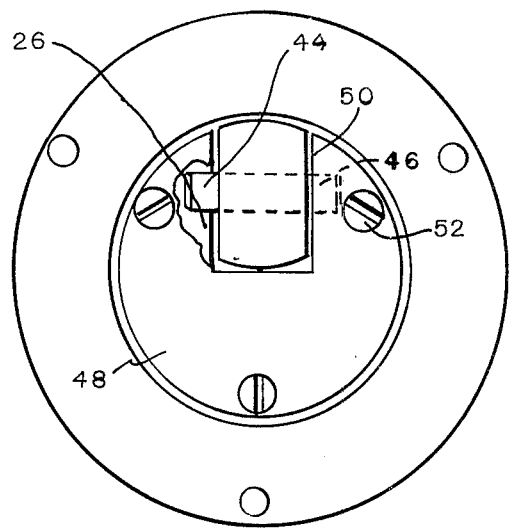

The assembly receives roller 42 which is mounted, with conventional roller bearings or needle bearings, on shaft 44. Shaft 44 is received in a pair of opposed slots 46 (see FIG. 2) in the opposed faces of upright standards 26. Cover plate 48 overlies the assembly and has a radial slot 50 for mounting about roller 44. Plate 48 overlies the ends of shaft 44, securing the shaft in the assembly. The plate 48 is secured in the assembly by a plurality of machine screw fasteners 52 which are engaged in threaded bores in the upper faces of the upright standards 26 and the partial circular wall 22.

Figure 3:
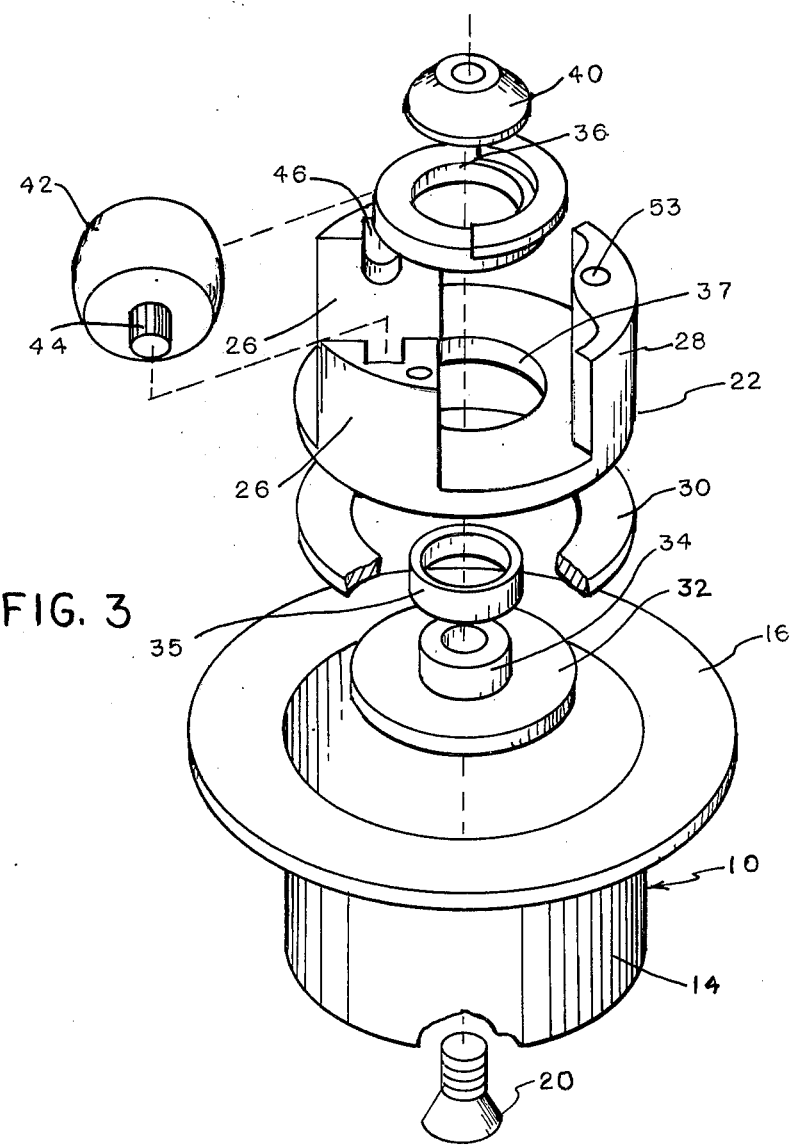
FIG. 3 is an exploded perspective view of the assembly of FIGS. 1 and 2.

The structure of the aforedescribed roller assembly is more apparent from FIG. 3 where the various elements are shown in an exploded view. The annular bearing assembly 30 accomodates the thrust loading while bushing 35, which can be formed of suitable oil impregnated brass or bronze materials, provides the bearing support between the neck 34 of ring 32 and inner annular face of retainer ring 36. The annular face of retainer 36 is received in central aperture 37 of the support 22. The threaded apertures 53 are shown in the upper faces of the upright, spaced-apart supports and the partial cylindrical wall 28.

Referring now to FIGS. 4-6, another embodiment of the invention is disclosed. This embodiment is preferred in installations where the maximum overall height is not as limited as that of the embodiment for FIGS. 1-3. As illustrated, this embodiment has a metal casting 60 for the cup-shaped housing which includes a bottom wall 62 and upright cylindrical wall 64. The central portion of bottom wall 62 is depressed at 66 and is provided with a countersunk aperture 68 to receive machine fastener screw 70.

The inside floor of the cup-shaped housing has an annular groove 72 for seating of the bearing assembly 74 which, as previously mentioned, is a conventional and commercially available of upper and lower bearing races with needle bearings therebetween. The floor of the housing also supports a central upright, cylindrical boss 76. A generally cylindrical roller support 78 is rotatably mounted within the housing 60 and this support has an annular groove 80 which seats on the upper bearing race in the assembly. A sleeve 82 is mounted about the cylindrical boss 76 and a second, bearing sleeve 84 surrounds the first sleeve. These sleeves are retained by retainer ring 86 which is secured by lock nut 88 on machine screw 70.

The roller 42 is seated on the roller support with the opposite ends of shaft 44 received within opposed slots 46 which are milled into the upper surfaces of the opposed faces 90 and 92 of the roller support 78. As shown in FIG. 6, roller support 78 has an exterior cylindrical surface with chordal shoulders 94 and 96 that are spaced apart by the radial slot defined by opposed faces 90 and 92. The roller 44 is received within this radial slot. A slot 98 is milled into each of the chordal shoulders 94 and 96 for seating of the ring retainer 86.

In the assembly shown in FIG. 6, the bearing sleeves 82 and 84 are assembled to the roller support 78 from the undersurface thereof while the ring 86 is seated in the slots 98. Thereafter the machine screw 70 is inserted and lock nut 88 is attached to complete the sub-assembly of the housing and roller support and the necessary thrust and rotational bearings.

The roller 44 with its dependent bearings and shaft 46 is mounted in the radial slot of the roller support 78 with the ends of shaft 44 seated within slots 46. The assembly is completed by placing cover plate 48 over the assembly and securing the cover plate by inserting machine screws 52 through countersunk apertures 100 and into threaded bores 53 of the roller support 78.

The invention as thus described provides a very stable structure capable of high loadings. The single roller is supported by a massive cast structure of the roller support. This roller support also provides the attachment facilities for securing the cover plate which retains the roller in the assembly. The sub-assembly of housing the roller support is simple in fabrication since the entire sub-assembly is secured by a single screw fastener. The roller support member is supported on its entire undersurface by a wide, annular thrust bearing insuring that the loading is evenly distributed across the base of the housing. Accordingly, the invention provides a very facile fabrication of an assembly capable of very high loadings.

The housing casting 60 has an upper, radially outward flange 102 to overlie the receiving aperture in the support plate, such as the roller support tray. The housing also has a plurality of axial ribs 104 which are evenly spaced about its outer periphery. These axial ribs 104 are received in cooperative notches of the receiving aperture and are separated from flange 102 by a slot 106 (see FIG. 4). This structure permits the easy installation and locking of the roller assembly in a roller tray since the housing is inserted into the notched aperture of the roller tray and then rotated approximately 45° to move the axial ribs 104 out of alignment with the mating notches of the aperture, thereby securing the assembly in the aperture against any axial displacement.

The invention has been described with reference to the presently preferred embodiments thereof. It is not intended that the description of the preferred embodiments be unduly limiting of the invention. Instead, it is intended that the invention be defined by the means, and their obvious equivalence, set forth in the following claims:

What is claimed is:

1. A load bearing roller assembly comprising:
    a cup housing to be received in apertures of a support plate and having a bottom wall, cylindrical side wall and an annular flange about its upper edge;
    a roller support received within said housing with an annular base wall and a pair of spaced-apart upright standards;
    annular bearing means captured between said base wall of said roller support and bottom wall of said housing;
    roller-shaft-receiving slots on opposed faces of said standards and open at the upper ends thereof;
    a roller and roller shaft respectively received between said faces and in said slots;
    assembly retainer means including fastener means extending through a central aperture in said housing bottom wall and a ring retainer overlying said roller support base wall; and
    a cover plate secured to the top faces of said standards with a radial slot to receive said roller and overlie said opposed slots and retain said roller shaft.

2. The assembly of claim 1 wherein the undersurface of said roller support has an annular groove to receive said annular bearing means.

3. The assembly of claim 2 wherein said housing is a sheet metal stamping and a base ring is mounted on the inside floor of said housing and received within said annular bearing means.

4. The assembly of claim 2 wherein said housing is a metal casting and has an annular groove on its inside floor to receive said annular bearing means.

5. The assembly of claim 4 including axial rib means on the outside cylindrical wall of said housing to cooperate with notch means in the receiving apertures of said support plate.

6. The assembly of claim 3 wherein said roller support includes a partial cylindrical wall equally spaced apart to said standards.

7. The assembly of claim 6 incuding threaded bores in the top faces of said standards and partial cylindrical wall to receive assembly screws securing said cover plate.

8. The assembly of claim 1 wherein said fastener means comprises a screw fastener and said ring retainer is secured by lock nut means on said screw fastener.

* * * * *